United States Patent [19]
Fukke et al.

[11] Patent Number: 5,180,616
[45] Date of Patent: Jan. 19, 1993

[54] HARD DISK MAGNETIC RECORDING MEDIUM COMPRISING MAGNETIC POWDER AND A BINDER AND HAVING A SPECIFIED MAGNETIC LAYER THICKNESS AND SURFACE ROUGHNESS

[75] Inventors: Hajime Fukke, Tama; Motoo Akagi, Tokyo; Iwao Matsuyama, Sagamihara; Masayuki Katsumoto, Kodaira; Hitoshi Inoue, Kokubunji; Naoki Kodama, Tachikawa; Yasutaro Uesaka, Kokubunji, all of Japan

[73] Assignee: Hitachi, Ltd., Tokyo, Japan

[21] Appl. No.: 293,177

[22] Filed: Jan. 3, 1989

Related U.S. Application Data

[63] Continuation-in-part of Ser. No. 64,569, Jun. 22, 1987, abandoned.

[30] Foreign Application Priority Data

| Jun. 23, 1986 | [JP] | Japan | 61-144935 |
| Nov. 14, 1986 | [JP] | Japan | 61-269652 |
| Jan. 27, 1988 | [JP] | Japan | 63-14441 |
| Sep. 28, 1988 | [JP] | Japan | 63-241101 |

[51] Int. Cl.$^5$ .............................. G11B 05/00
[52] U.S. Cl. ........................ 428/64; 428/65; 428/336; 428/694; 428/900
[58] Field of Search .......... 428/141, 336, 694, 900, 428/64, 65; 427/128, 131, 372.2

[56] References Cited

U.S. PATENT DOCUMENTS

| 2,581,414 | 1/1952 | Hochberg | 241/22 |
| 4,229,312 | 10/1980 | Nagashiro et al. | 252/62.54 |
| 4,537,833 | 8/1985 | Kasuga et al. | 428/328 |
| 4,634,627 | 1/1987 | Fujiki et al. | 428/323 |
| 4,789,581 | 12/1988 | Fokke et al. | 428/65 |
| 4,880,666 | 11/1989 | Ito et al. | 427/128 |
| 4,895,758 | 1/1990 | Savemoto et al. | 428/323 |
| 4,918,556 | 4/1990 | Ezaki et al. | 360/97.02 |

FOREIGN PATENT DOCUMENTS

| 1130612 | 6/1965 | Fed. Rep. of Germany . |
| 1283282 | 11/1968 | Fed. Rep. of Germany . |
| 2719285 | 4/1978 | Fed. Rep. of Germany . |
| 2714589 | 7/1986 | Fed. Rep. of Germany . |

*Primary Examiner*—Paul J. Thibodeau
*Assistant Examiner*—Steven A. Resan
*Attorney, Agent, or Firm*—Antonelli, Terry Stout & Kraus

[57] ABSTRACT

A method for manufacturing a magnetic paint by mixing a resin composition powder as a dispersing binder for a magnetic powder with the magnetic powder, or together with a filler, and grinding the mixture under a high shear stress is disclosed. A magnetic recording medium such as a magnetic disk, etc., prepared by using the magnetic paint, can have a magnetic coating film having a substantially uniform film thickness of not more than 0.9 μm and a surface roughness of not more than 0.05 μm Ra before surface finishing.

1 Claim, 4 Drawing Sheets

HARD DISK MAGNETIC RECORDING MEDIUM COMPRISING MAGNETIC POWDER AND A BINDER AND HAVING A SPECIFIED MAGNETIC LAYER THICKNESS AND SURFACE ROUGHNESS

CROSS REFERENCE TO THE RELATED APPLICATION

This is a continuation-in-Part application of U.S. Ser. No. 07/64,569 filed Jun. 22, 1987 now abandoned.

BACKGROUND OF THE INVENTION

1. Field of the Invention

This invention relates to a magnetic recording medium, and particularly to a method for manufacturing a magnetic paint for forming a magnetic recording film on a magnetic recording medium, and a magnetic recording medium suitable for a high recording density magnetic disk having distinguished electrical characteristics and reliability, prepared by using the magnetic paint.

2. Description of the Related Art

Methods for preparing a magnetic recording medium by applying a magnetic paint comprising a magnetic powder dispersed in a polymer binder including epoxy resin, etc., have been proposed (e.g., Japanese Patent Publication No. 55-816), and methods for manufacturing a magnetic paint by grinding a magnetic powder together with epoxy resin, etc., are disclosed in Japanese Patent Publication No. 57-40566 and Japanese Patent Application Kokai (Laid-open) No. 56-100871, where the magnetic powder is ground together with a resin solution comprising epoxy resin, etc., dissolved in cyclohexanone under a high shear stress to prepare a magnetic paint, and then a substrate is coated with the thus obtained magnetic paint to prepare a magnetic recording medium. However, in the prior art, no consideration has been given to thorough mixing of the magnetic powder with epoxy resin as a binder for the dispersion of the magnetic powder before grinding. Thus, in the magnetic paints obtained according to the prior art methods, a small amount of the resin solution as added at the grinding is locally absorbed into a portion of the magnetic powder, and the grinding is carried out in the locally absorbed state. That is, it has been quite difficult due to the nature of grinding to obtain a magnetic paint of such a tactoid structure that the magnetic powder is uniformly dispersed throughout the mixture. Consequently, it has been impossible to form a thin film having a film thickness of not more than about 0.9 $\mu$m as a magnetic recording film from the magnetic paint manufactured according to the prior art methods. Also, the film, even if formed, has a surface roughness of about 0.08 $\mu$m Ra before surface finishing.

With a keen demand for magnetic disks having higher recording density and consequent smaller film thickness, the surface finishing work is inevitably increased, resulting not only in an increased surface finishing time, but also in an increased occurrence of surface defects such as scratches on the film surface and a consequent increase in electrical defects.

The magnetic paint manufactured according to the said prior art methods has an insufficient dispersion of magnetic powder throughout the magnetic paint, and it is substantially impossible to form a thin film having a film thickness of not more than 0.9 $\mu$m from such a magnetic paint, and the film, even if formed, has a surface roughness of about 0.08 $\mu$m Ra before the surface finishing.

Furthermore, in high density recording magnetic disk drives which are now widely used, a thin film magnetic head is used as a magnetic head, and thus a magnetic disk medium having a large film thickness has another problem such as a failure to thoroughly write signals. Usually, a magnetic disk medium has a magnetic thin film so formed on a disk plate as a substrate as to have a smaller film thickness on the inner peripheral side and a larger film thickness on the outer peripheral side. Thus, the aforementioned problem concerning the thin film magnetic head usually occurs on the outer peripheral side of the magnetic disk medium. To solve the problem, it is necessary that the magnetic disk medium has a magnetic thin film having a smaller film thickness on the outer peripheral side. However up to now no method other than intensifying the film finishing work to the film surface on the outer peripheral side more than that to the film surface on the inner peripheral side has been taken. As a result, the surface finishing time and frequency of scratch occurrence, and consequently electrical defects are inevitably increased. The increase in the electrical defects may cause a maloperation in the magnetic recording —reproducing apparatus, and scratches developed on the film surface also damage the disk-facing side of the magnetic head and cause head crushes.

SUMMARY OF THE INVENTION

An object of the present invention is to provide an improved method for manufacturing a magnetic paint containing a magnetic powder in a well dispersed state throughout the paint.

Another object of the present invention is to provide a magnetic recording medium having a magnetic recording film as a thin layer, prepared from the magnetic paint manufactured according to the present method, where the thin film has such a small surface roughness before surface finishing as to improve the signal/noise (S/N) ratio of the magnetic recording medium and also has a film thickness of not more than 0.9 $\mu$m on both the inner and outer peripheral sides.

In order to make a magnetic recording film having a film thickness of not more than 0.9 $\mu$m, it is necessary to use a magnetic paint diluted with a large amount of a solvent. Thus, the conventional magnetic paints are diluted with a large amount of a solvent and the magnetic powder in the paints are highly flocculated to form flocs of magnetic powder having sizes of 3 to 10 $\mu$m. When a magnetic paint containing a large amount of flocs of magnetic powder having such particle sizes as 3 to 10 $\mu$m is applied to a non-magnetic substrate, the large flocs of magnetic powder will exist spotwise on the film surface. Thereafter, even if a magnetic field is applied to the film to make magnetic alignment, the large flocs of magnetic powder will keep their shapes without crumbling. As a result, a large number of pin holes will be formed to such sizes that the nonmagnetic substrate as an underlayer can be seen through the pin holes, and electrical defects or errors will be increased. It is needless to say that the surface roughness of the resulting film will be increased and consequently disk noises will be increased. Even by surface finishing to make the film surface smooth, the disk noises will not be decreased, because the disk noises depend upon the surface roughness before surface finishing.

The present invention provides a magnetic paint whose magnetic powder never flocculates even if diluted with a large amount of a solvent. In the present magnetic paint, the magnetic powder forms loose flocs having smaller sizes. A magnetic powder having a BET specific surface area of not less than 40 m$^2$/g produces flocs of the magnetic powder having sizes of not more than 1 μm, and a magnetic powder having a BET specific surface area of about 20 m$^2$/g produces flocs of the magnetic powder having sizes of 1 to 3 μm. Thus, when such a magnetic paint as above is applied to a non-magnetic substrate and subjected to magnetic alignment, the small loose flocs of magnetic powder are very readily crumbled so that the magnetic powder can be uniformly dispersed in the film. As a result, the resulting film surface of a magnetic disk can be made smooth and the surface roughness of the film can be made smaller. That is, the disk noise will be lowered.

Furthermore, since the magnetic powder is uniformly dispersed throughout the film, any pin holes, which allow the non-magnetic substrate as an underlayer to be seen, are not formed, resulting in less electrical defects.

From a magnetic paint where a magnetic powder having a BET specific surface area of about 20 m$^2$/g is dispersed, a film having a film thickness of 0.4 to 0.5 μm, as coated, can be formed all over the surface from the outer peripheral side to the inner peripheral side of a magnetic disk. From a magnetic paint where magnetic powder having a BET specific surface area of not less than 40 m$^2$/g, a film having a film thickness of 0.02 to 0.9 μm, as coated, can be formed all over the surface from the outer peripheral side to the inner peripheral side of a magnetic disk. By making the film thickness of the film on the magnetic disk smaller, the resolution of the magnetic disk can be increased and the line recording density D$_{50}$ of the magnetic disk can be also remarkably increased, as will shown in Table which will be given later.

It seems that the film thickness of the film on the magnetic disk may be made smaller by surface finishing, but it is now very difficult to make a film having a film thickness of, for example, 0.4±0.04 μm or 0.2±0.02 μm from a film having a film thickness of more than 0.9 μm. Furthermore, more intensified surface finishing will increase the surface finishing time, which will give more chances for forming scratches leading to electrical defects.

As a result of extensive studies, the present inventors have found that a magnetic paint of tactoid structure where magnetic powders are uniformly dispersed throughout the paint can be manufactured by using at least one of epoxy resin, phenol resin, etc., in a powdery form as a binder for dispersing a magnetic powder in place of the resin in solution which has so far been used, thoroughly mechanically mixing the resin powder with the magnetic powder in advance, then grinding the mixture under a high shear stress, thereby bringing the resin powders into a substantially molten state and obtaining a uniformly ground mixture with the magnetic powder, and then subjecting the magnetic paint of such a tactoid structure that the magnetic powder is uniformly dispersed throughout the mixture to the same ball milling as has so far been used. Furthermore, the present inventors have found that when a magnetic recording medium, for example, a 14-inch magnetic disk, is prepared by applying the thus obtained magnetic paint to a non-magnetic disk plate as a substrate and subjecting the thus formed thin film on the substrate to a magnetic alignment, the magnetic recording medium can have a surface roughness of not more than 0.050 μm Ra before surface finishing, and can also have a substantially uniform film thickness of not more than 0.9 μm all over the medium surface from the inner peripheral side to the outer peripheral side.

DESCRIPTION OF THE PREFERRED EMBODIMENTS

Grinding of magnetic powder under a high shear stress is usually carried out in the presence of a small amount of a resin solution, but the resin solution is locally absorbed into a portion of the magnetic powder, and consequently the magnetic powder and the resin are not easily brought into a uniformly mixed state, whereas the solids are more easily mixed with one another to form a uniform mixture. In the present invention, the resin composition in a fine powdery state, particularly, epoxy resin, etc., finely pulverized to less than 1,000 μm, preferably less than 200 μm, is thoroughly mixed with the magnetic powder in advance, and thus the magnetic powder and the resin composition can be readily mixed into a uniformly distributed mixture. The resin powder grains swell through addition of a solvent or a liquid dispersing binder thereto or melt through heating, and the molten resin powder grains as nucleii absorb the magnetic powder, resulting in a magnetic paint of complete tactoid structure. Thus, it seems that a magnetic thin film having a very low surface roughness can be formed from such a magnetic paint.

The liquid dispersing binder includes, for example, epoxy resin, phenol resin, acrylic resin, etc., each having a molecular weight of not more than 700. A solid dispersing binder includes, for example, epoxy resin, phenol resin, etc., each having a molecular weight of not less than 700, mostly not less than 1,000. In the case of melting by heating, it is preferable to use a resin having a melting point of about 100° C.

Figure 1:
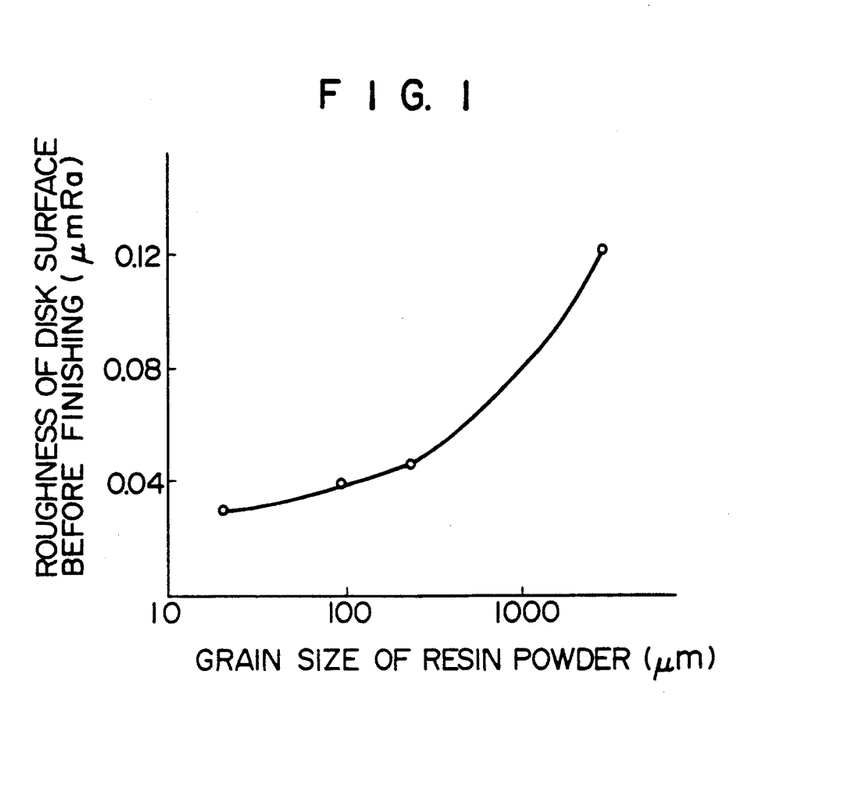
FIG. 1 is a diagram showing the relationship between the grain size of resin powder and the surface roughness of magnetic disks before surface finishing of the magnetic disks.
Figure 2:
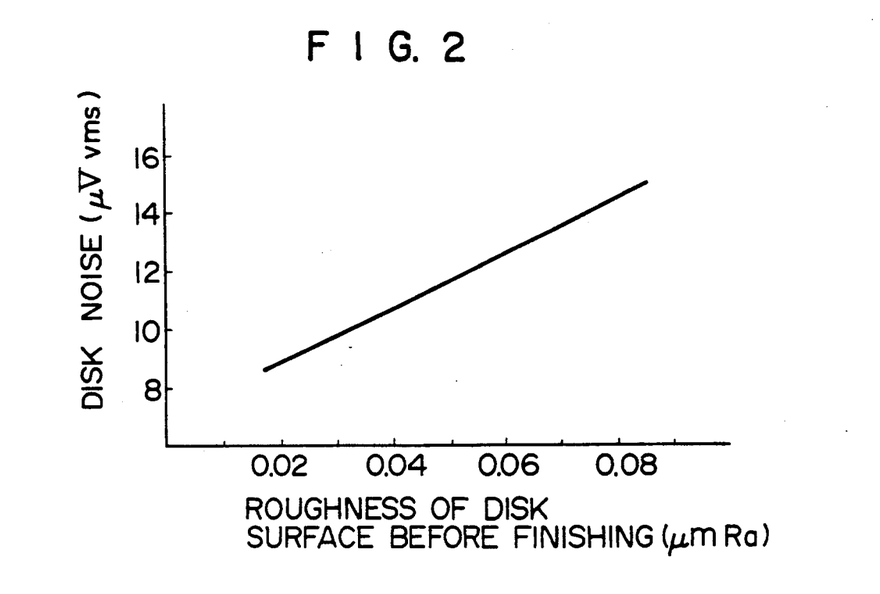
FIG. 2 is a diagram showing the relationship between the surface roughness of magnetic disks before the surface finishing of the magnetic disks and the disk noise.

As described above, powdery resin such as epoxy resin, phenol resin, etc., in a powdery state, is used for dispersing the magnetic powder in the present invention, and a thin film with a lower surface roughness can be obtained with the powdery resin of smaller grain size. The grain size of the powdery resin for use in the present invention is less than 1,000 μm, preferably less than 200 μm. The smaller the grain size, the higher the effect. For example, a magnetic disk obtained from a magnetic paint containing a resin powder having grain sizes of about 200 μm has a surface roughness of about 0.045 μm Ra before surface finishing, whereas that obtained from a magnetic paint containing a resin powder having grain sizes of about 100 μm has a surface roughness of about 0.040 μm Ra, as shown in FIG. 1. Thus, the magnetic disk can have a lower noise, as shown in FIG. 2.

By increasing the amount of a solvent in a magnetic paint, flocculation of a magnetic powder proceeds, and it becomes impossible to obtain a thin film having a good surface roughness (flatness) by applying the magnetic paint. This tendency is particularly pronounced in a magnetic paint where magnetic powder takes a tactoid structure, for example, prior art magnetic paints where the magnetic powder is dispersed in an epoxy resin solution, as disclosed in Japanese Patent Publication No. 57-40566 and Japanese Patent Application Kokai (Laid-open) No. 56-100871.

In the present magnetic paint, no flocculation of the magnetic powder proceeds even with increasing amount of a solvent in the magnetic paint, though the magnetic powder takes a tactoid structure in the paint, and thus it is possible to obtain a thin film having a low surface roughness, as mentioned above. A distinguishing feature of the present magnetic paint is that a thin film has a uniform thickness, for example, 0.5 μm before surface finishing can be formed without any substantial difference in the film thickness from the inner peripheral side to the outer peripheral side all over the surface of a magnetic disk plate (8.8 inch or 14 inch in diameter) by high speed spin coating of the present magnetic. On the other hand, in case of high speed spin coating of a conventional magnetic paint, a thin film is formed with a film thickness gradient, that is, thinner on the inner peripheral side and thicker on the outer peripheral side, on a magnetic disk plate. A higher resolution can be produced on the magnetic disk thereby, and no writing problems with a magnetic thin film head occur. The thin film-finishing time can be considerably shortened.

Figure 4:
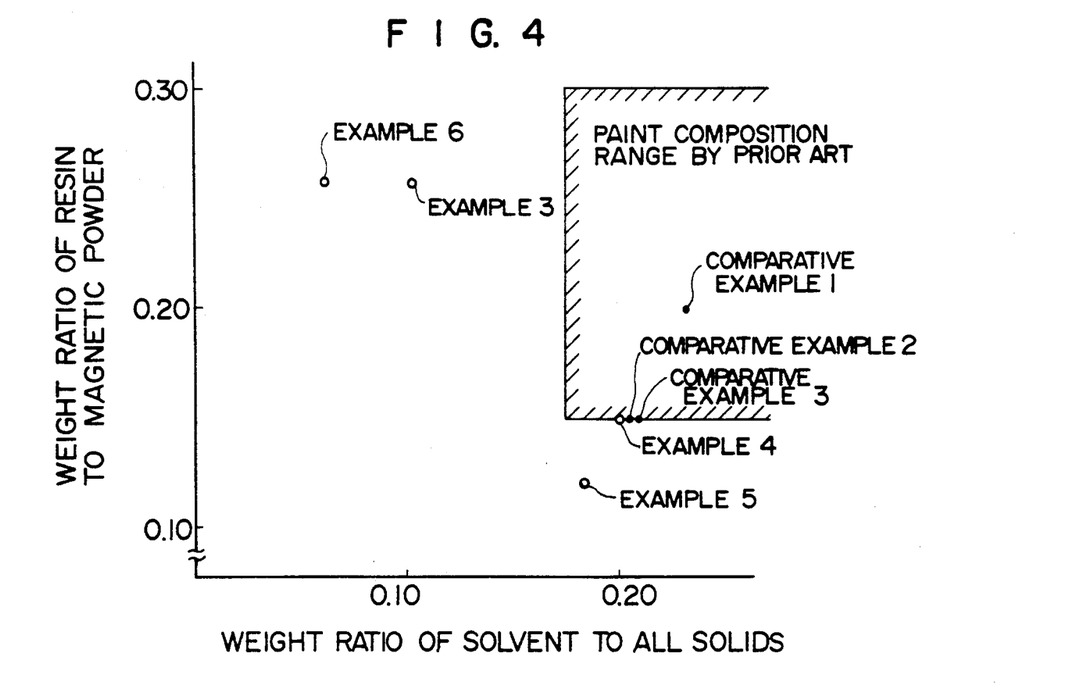
FIG. 4 is a diagram showing the relationship between the weight ratio of a resin powder to a magnetic powder and the weight ratio of a solvent to solids in kneader mixing.

In grinding a magnetic powder with, for example, epoxy resin under a high shear stress in a kneader, a paint composition range obtained by grinding under a high shear stress is shown in FIG. 4, by way of the relationship between a weight ratio of a resin to a magnetic powder on the ordinate and a weight ratio of a solvent to all solids (magnetic powder +resin +filler, etc.) on the abscissa, while fixing the kinds of magnetic powders, resin. As can be seen from FIG. 4, the present paint composition range using epoxy resin in the powdery form is broader than the prior art composition range using epoxy resin in the solution form. That is, grinding in the presence of a smaller amount of a solvent, i.e. grinding under a higher shear stress, can be carried out, and thus the resulting magnetic disk can have a higher S/N ratio. Furthermore, grinding in the presence of a smaller amount of epoxy resin can be carried out, and thus the content of the magnetic powder can be increased.

As described in detail above, a magnetic paint manufactured according to the present method has a tactoid structure where a magnetic powder is uniformly dispersed throughout the paint. When the thus manufactured magnetic paint is applied to, for example, an aluminum disk plate, 14 inches in diameter, to prepare a magnetic disk, i.e., a hard disk, a magnetic thin film which has a uniform and very small thickness, for example, not more than 0.9 μm all over the magnetic disk surface, that is, from the inner peripheral side to the outer peripheral side on the disk surface and which also has a surface roughness of not more than 0.050 μm Ra before surface finishing can be easily formed by a simple coating method such as spin coating. Thus, the surface finishing time can be reduced to substantially half of the time required in the prior art. This also leads to reduction of electrical defects due to scratches during surface finishing to substantially half. Furthermore, the noise of the thus obtained magnetic disk can be reduced by about 30%, and at the same time both output and resolution can be increased. Due to the small film thickness on the outer peripheral side of the present magnetic disk, no problems with a magnetic thin film head occur at all.

Other object of the present invention is to provide a method for manufacturing a magnetic paint with an improved dispersion state of magnetic powder in the paint. By making the surface roughness of the film before surface finishing smaller than 0.020 μm Ra, the S/N (signal/noise) ratio of a magnetic disk can be improved and the film thickness, as coated, can be made less than 0.6 μm all over the surface from the inner peripheral side to the outer peripheral side of the magnetic disk.

Further object of the present invention is to provide a magnetic recording - reproduction apparatus and a magnetic recording apparatus with a high S/N ratio and a high resolution.

Still further object of the present invention is to provide a magnetic recording—reproduction apparatus with less maloperation and less occurrence of head crush.

As a result of extensive studies, the present inventors have found that these objects can be attained by thoroughly mechanically mixing a magnetic powder having a BET specific surface area of not less than 40 m$^2$/g with pulverized epoxy or phenol resin having particle sizes of not more than 20 μm as a binder for dispersing the magnetic powder in advance instead of the so far used solution of a solid resin such as epoxy or phenol resin in a block or plate shape, then adding an appropriate amount of a solvent or a liquid polymeric binder to the mixture, thereby swelling the pulverized resin or heating the mixture, thereby melting the powdery resin, then grinding the mixture under a high shear stress, thereby uniformly kneading the resin substantially in a molten state with the magnetic powder, and then subjecting the uniformly ground mixture to the same ball mill grinding as has so far been used, thereby obtaining a magnetic paint of such a tactoid structure that the magnetic powder is uniformly dispersed throughout the mixture. That is, the present inventors have found that, when the thus obtained magnetic paint was applied to a non-magnetic substrate and then subjected to magnetic alignment, the resulting magnetic disk, 5.25 inch in diameter, had a very small surface roughness such as not more than 0.020 μm Ra before surface finishing and a substantially uniform film thickness of not more than 0.6 μm. Thus, the objects of the present invention can be fully attained. The thickness of the magnetic film on the magnetic disk is measured with a X-ray micro film thickness meter and the measurements are calibrated in advance in the following manner. That is, part of the film on the magnetic disk is masked and the non-masked part of the film is fired with a plasma asher, and then a difference between the film surface and the aluminum substrate is optically measured.

Furthermore, it is also possible in the present invention to form a very thin magnetic film having a film thickness of 0.02 μm and a surface roughness of 0.008 μm Ra before surface finishing without any visible defects. That is, a magnetic disk with a smooth film can be obtained without much surface finishing, particularly with no surface finishing in case of a film thickness of not more than 0.2 μm, that is, only with vanishing (removal of projections from the film surface).

Since the film thickness is as small as 0.6–0.02 μm and the surface roughness is also as small as 0.02–0.008 μm Ra before surface finishing in the present invention, surface finishing is not substantially required, and even if surface finishing is made, the amount of surface finishing is much smaller than that of the prior art and thus a magnetic recording-reproduction apparatus with less possibility for forming scratches and thus for maloperation and with the distinguished S/N ratio and resolution can be provided in the present invention.

In order to grind the magnetic powder under a high shear stress, a small amount of a resin solution is usually added thereto before the grinding. However, the added resin solution is locally absorbed into a portion of the magnetic powder and the magnetic powder and the resin are hardly brought into a uniformly mixed state. On the other hand, a uniform mixture can be more easily obtained from solid-solid components.

In the present invention, a resin composition of epoxy resin, etc. finely pulverized to sizes of less than 20 μm and magnetic powder having a BET specific surface area of not more than 40 $m^2/g$ are thoroughly mixed together in advance and thus a uniformly mixed state can be obtained between the magnetic powder and the resin composition. Then, a solvent is added thereto, whereby the resin particles are smaller and act as nuclei for adsorbing the magnetic powder. Thus, a magnetic paint of uniform tactoid structure can be obtained by grinding such a uniform mixture under a high shear stress. It seems that consequently a magnetic film with a very low surface roughness can be formed from the uniformly ground mixture.

Solid thermo-setting resin such as epoxy resin, phenol resin, etc. is used, after pulverization, for dispersing the magnetic powder. The smaller the particle size of the resin powder, or the larger the specific surface area of the magnetic powder, the lower the surface roughness. That is, application of a film with a lower surface roughness is possible. The particle size of the resin powder is preferably not more than 20 μm, more preferably not more than 10 μm. The BET specific surface area of the magnetic powder is preferably not less than 40 $m^2/g$, more preferably not less than 50 $m^2/g$.

By increasing the amount of the solvent in the magnetic paint, floculation of the magnetic powder usually proceeds in the magnetic paint, making the application of a film impossible and also lowering the surface roughness (smoothness) of the film. This tendency is particularly pronounced in a magnetic paint where the magnetic powder forms a tactoid structure, for example, a paint where the magnetic powder is dispersed in an epoxy resin solution, as disclosed in Japanese Patent Publication No. 57-40566 and Japanese Patent Application Kokai (Laid-open) no. 56-100871 as prior art.

In the present magnetic paint, flocculation of the magnetic powder never proceeds even by increasing the amount of the solvent in the paint, though the magnetic powder forms a tactoid structure in the paint, and thus application of a film with a lower surface roughness as mentioned above is possible. The distinguishedness of the present magnetic paint is that, when a conventional magnetic paint is applied to a magnetic disk by spin coating, coating is made thinner on the inner peripheral side of the magnetic disk and thicker on the outer peripheral side, whereas in case of the present magnetic paint coating can be made with no substantial difference in the film thickness all over the surface from the inner peripheral side to the outer peripheral side of a magnetic disk, for example, 5.25 inch in diameter, by high speed spin coating. That is, a uniform film with a film thickness of, for example, 0.5 μm before surface finishing, can be formed all over the surface from the inner peripheral side to the outer peripheral side of a magnetic disk, whereby the magnetic disk can have a higher resolution without any problem, which arises in writing with a thin film head, and the time of surface finishing can be also largely shortened.

As already mentioned above, flocculation of magnetic powder proceeds by increasing the amount of the solvent in the magnetic paint, making the application of a film impossible and also deteriorating the surface roughness (smoothness). This is also true of the magnetic paints disclosed in Japanese Patent Application Kokai (Laid-open) No. 63-48612, where the individual particles of magnetic powder are dispersed at random in the paint to make a considerably stable magnetic paint, but the resulting film has a surface roughness of 0.30 μm Ra and a film thickness of 0.2 μm as limits before surface finishing and also has a large difference in the film thickness on the surface between the inner peripheral side and the outerperipheral side, and thus surface finishing is indispensable. A film with a surface roughness and a film thickness below the limit values has visually observable defects on the film surface.

Even if a magnetic powder having a BET specific surface area of not less than 40 $m^2/g$ used in the present invention is dispersed according to the process for preparing a magnetic paint disclosed in Japanese Patent Application Kokai (Laid-open) No. 63-48612, no magnetic disks with better characteristics than the above-mentioned are obtained. On the other hand, in magnetic paints where a magnetic powder is dispersed in a bundle form, for example, a form of several tens of bundles in the magnetic paint, that is, paints where the magnetic powder is dispersed in a bundle form in epoxy resin, as disclosed, for example, in Japanese Patent Publication No. 57-40566 and Japanese Patent Application Kokai (Laid-open) No. 63-4422, flocculation of magnetic powder proceeds considerably by increasing the amount of the solvent in the magnetic paint. The limit to the film thickness of a film prepared from these magnetic paints is 0.9 μm (Japanese Patent Publication No. 57-40566) and 0.45 μm [Japanese Patent Application Kokai (Laid-open) No. 63-4422] and the limit to the surface roughness is 0.030 μm Ra before surface finishing.

In the present magnetic paint, flocculation of the magnetic powder never proceeds even by increasing the amount of the solvent in the paint, though the magnetic powder forms a tactoid structure in the paint, and thus application of a film with a lower surface roughness as mentioned above is possible. The distinguishedness of the present magnetic paint is that, when a conventional magnetic paint is applied to a magnetic disk by spin coating, coating is made thinner on the inner peripheral side of the magnetic disk and thicker on the outer peripheral side, whereas in case of the present magnetic paint coating can be made with no substantial difference in the film thickness on the surface between the inner and outer peripheral sides of a magnetic disk, for example, 5.25 inches in diameter, by high speed spin coating. That is, a uniform film with a film thickness of, for example, 0.05 μm and a surface roughness of 0.01 μm Ra before surface finishing, can be formed all over the surface from the inner peripheral side to the outer peripheral side, whereby the magnetic disk can have a higher resolution and a lower noise without surface finishing.

A most important problem of a disk with such an ultra-thin film is the reliability of the film. The present invention provides not a continuously deposited medium, but a coated medium and thus it is possible to add a reinforcing material to the film or make the film porous and impregnating the pores with a liquid lubricant. Various means are available for keeping the reliability of the film at a high level, and a particularly effective means is to add fine single crystal alumina particles or fine diamond particles having a smaller particle size than the thickness of the film before surface finishing as a reinforcing material. Another means is to make a film of double layer structure, for example, to apply a resin containing a small amount of a reinforcing material as dispersed in a polymeric binder as an underlayer and then provide a very thin magnetic layer of the present invention thereon as an upper layer.

The reason why the magnetic powder undergo no flocculation even if the amount of the solvent is increased in the present magnetic paint is that thermosetting resin in a fine powdery state such as epoxy resin, phenol resin, etc., as uniformly dispersed among the magnetic powder, is strongly chemically adsorbed onto the surface of the magnetic powder through the grinding under a high shear stress. In case of epoxy resin, the terminal epoxy groups undergo ring opening through the grinding under a high shear stress and combine with the OH groups that exist on the surface of magnetic powder. These reactions are not expectable in case of thermoplastic resin used for dispersion of magnetic powder in a magnetic tape, such as polyvinyl chloride, vinyl chloride copolymer, nitrocellulose, etc.

A kneader-grinder for use in the practice of the present invention has, for example, a grinding capacity of 1 l with a power of 2.2 kW and 4 Hp, where 800 g of magnetic powder is charged and ground with rotating blades at 30 rpm. In that case, the grinding is carried out under a shear stress of at least $10^5$ dynes/cm$^2$. In the present invention, it is necessary to conduct the grinding under a high shear stress of $10^5$ dynes/cm$^2$ or more.

The present invention will be described in detail below, referring to Examples.

EXAMPLE 1

Epoxy resin in a plate form was pulverized in a mixer to obtain epoxy resin powder having grain sizes of about 200 μm. 25 parts by weight of the thus obtained epoxy resin powder, 100 parts by weight of a magnetic powder and 10 parts by weight of single crystal alumina were thoroughly mixed, then admixed with 10 parts by weight of cyclohexanone, then further mixed in a kneader, and then admixed with 5 parts by weight of cyclohexanone. The mixture was then ground under a high shear stress for about 4 hours.

The ground mixture was placed in a ball mill pot, and 200 parts by weight of a solvent mixture of cyclohexanone and isophorone was added thereto. The mixture was subjected to ball milling for 5 days to disperse the magnetic powder throughout the mixture. Then, a solution containing 25 parts by weight of phenol resin and 6 parts by weight of vinyl resin in 280 parts by weight of a solvent mixture of cyclohexanone, isophorone and dioxane was added to the ball-milled mixture to prepare a magnetic paint for magnetic disks. Then, an aluminum disk plate, 14 inches in diameter, whose surfaces were cleaned in advance, was spin coated with the magnetic paint at 1,000 rpm and then subjected to magnetic alignment according to a known procedure. The thus coated magnetic disk was cured at 210° C. and its film thickness and surface roughness were measured.

The thus obtained disk had a film thickness of 0.8 μm at R 105 mm (an abbreviation for designating such a disk radius position, that is, a distance of 105 mm from the center of the disk—similar abbreviations will be hereinafter used for similar desigrations) and 0.9 μm at R 170 mm before surface finishing and a surface roughness of 0.045 μm Ra before surface finishing, whereby the disk noise could be reduced by 20%, as compared with that of the conventional magnetic disk having a surface roughness of 0.08 μm Ra.

EXAMPLE 2

Epoxy resin powder having grain sizes of about 200 μm was prepared, and a magnetic paint and a magnetic disk were prepared in the same mixing ratio and preparatory manner as in Example 1, except that the thus prepared epoxy resin powder was used in place of the epoxy resin powder of Example 1. The thus obtained magnetic disk had a film thickness of 0.8 μm at R 105 mm and 0.9 μm at R 170 mm before the surface finishing and a surface roughness of 0.040 μm Ra before the surface finishing, whereby the disk noise could be reduced by 25%, as compared with that of the conventional magnetic disk.

EXAMPLE 3

Figure 3:
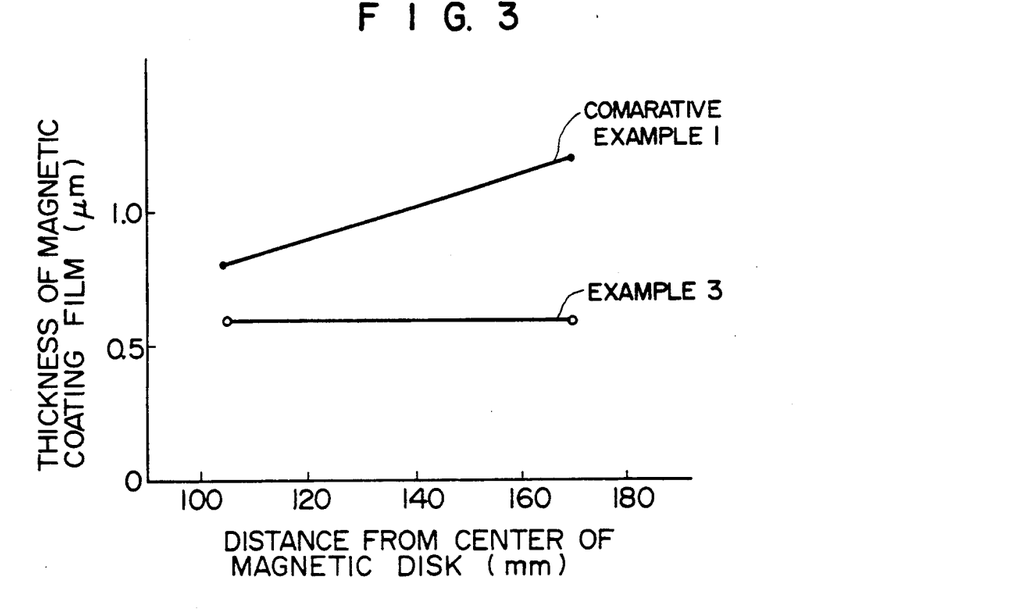
FIG. 3 is a diagram showing a thickness distribution of magnetic coating films before surface finishing of magnetic disks.

An aluminum disk plate, 14 inches in diameter, whose surfaces were cleaned in advance, was spin coated with the magnetic paint prepared in Example 3 at 1,500 rpm, subjected to magnetic alignment according to a known procedure, and cured at 210° C. Then, the film thickness and the surface roughness of the thus obtained magnetic disk were measured. The thus obtained magnetic disk had a film thickness of 0.6 μm at R 105 mm and 0.6 μm at R 170 mm before surface finishing, as shown in FIG. 3, and a surface roughness of 0.040 μm Ra before surface finishing, and no visual defects were observed on the film surfaces.

EXAMPLE 4

100 parts by weight of magnetic powder, 10 parts by weight of single crystal alumina and 15 parts by weight of epoxy resin powder having grain sizes of about 100 μm were thoroughly mixed, and then admixed with 20 parts by weight of cyclohexanone. Then, the thus obtained mixture was further mixed in a kneader, then admixed with 5 parts by weight of cyclohexanone, and ground under a high shear stress for about 4 hours.

The ground mixture was placed in a ball mill pot, admixed with 180 parts by weight of a solvent mixture of cyclohexanone and isophorone and subjected to ball milling for 5 days to disperse the magnetic powder throughout the mixture. Then, a solution containing 25 parts by weight of phenol resin and 6 parts by weight of vinyl resin in 350 parts by weight of a solvent mixture of cyclohexanone, isophorone and dioxane was added to the ball-milled mixture to prepare a magnetic paint for magnetic disks. Then, an aluminum disk plate, 14 inches in diameter, whose surfaces were cleaned in advance, was spin coated with the magnetic paint at 1,500 rpm, subjected to magnetic alignment according to a known procedure, and cured at 210° C. Then, the film thickness and the surface roughness of the magnetic disk were measured. The magnetic disk had a thickness of 0.45 μm at R 105 mm and 0.45 μm at R 170 mm before the surface finishing and a surface roughness of 0.045 μm Ra before the surface finishing. No visual defects were observed on the film surface.

EXAMPLE 5

100 parts by weight of magnetic powder and 12 parts by weight of epoxy resin powder having grain sizes of 100 μm were thoroughly mixed, then admixed with 15 parts by weight of cyclohexanone, and further mixed in a kneader. Then, the mixture was admixed with 5 parts by weight of cyclohexanone and ground under a high shear stress for about 4 hours.

Then, the ground mixture was placed in a ball mill pot, admixed with 165 parts by weight of a solvent mixture of cyclohexanone and isophorone, and subjected to ball milling for 5 days to disperse the magnetic powder throughout the mixture. Then, a solution containing 12 parts by weight of phenol resin and 4 parts by weight of vinyl resin in 200 parts by weight of a solvent mixture of cyclohexanone, isophorone and dioxane was added to the ball-milled mixture to prepare a magnetic paint for magnetic disks. Then, an aluminum disk plate, 14 inches in diameter, whose surfaces were cleaned in advance, was spin coated with the magnetic paint at 1,500 rpm, subjected to magnetic alignment according to a known procedure, and cured at 210° C. The thus obtained magnetic disk had a film thickness of 0.75 μm at both R 105 mm and R 170 mm and a surface roughness of 0.05 μm Ra before the surface finishing.

EXAMPLE 6

Epoxy resin powder having grain sizes of about 20 μm was prepared. 25 parts by weight of the epoxy resin powder, 100 parts by weight of magnetic powder and 10 parts by weight of single crystal alumina were thoroughly mixed, then admixed with 6 parts by weight of cyclohexanone, and further mixed in a kneader. Then, the mixture was admixed with 3 parts by weight of cyclohexanone, and ground under a high shear stress for about 4 hours.

Then, the ground mixture was placed in a ball mill pot, admixed with 200 parts by weight of a solvent mixture of cyclohexanone and isophorone, and subjected to ball milling for 5 days to disperse the magnetic powder throughout the mixture. Then, a solution containing 25 parts by weight of phenol resin and 6 parts by weight of vinyl resin in 280 parts by weight of a solvent mixture of cyclohexanone, isophorone and dioxane was added to the ball-milled mixture to prepare a magnetic paint for magnetic disks. Then, an aluminum disk plate, 14 inches in diameter, whose surfaces were cleaned in advance, was spin coated with the magnetic paint at 1,000 rpm, subjected to magnetic alignment according to a known procedure, and cured at 210° C.

The film thickness and the surface roughness of the thus obtained magnetic disk were determined. The magnetic disk had a film thickness of 0.8 μm at R 105 mm and 0.9 mm at R 170 mm before surface finishing, and a surface roughness of 0.030 μm Ra before surface finishing, whereby the disk noise could be reduced by 30%, as compared with that of the conventional disk.

COMPARATIVE EXAMPLE 1

100 parts by weight of magnetic powder and 10 parts by weight of single crystal alumina were mixed in a kneader, then admixed with a solution containing 14 parts by weight of epoxy resin in 21 parts by weight of cyclohexanone, and further mixed. Furthermore, a solution containing 6 parts by weight of epoxy resin in 9 parts by weight of cyclohexanone was added to the mixture, and then the mixture was ground under a high shear stress for about 4 hours.

The ground mixture was placed in a ball mill pot, and 5 parts by weight of epoxy resin and 180 parts by weight of a solvent mixture of cyclohexanone and isophorone were added thereto, and then the mixture was subjected to ball milling for 5 days to disperse the magnetic powder throughout the mixture. Then, a solution containing 25 parts by weight of phenol resin and 6 parts by weight of vinyl resin in 290 parts by weight of a solvent mixture of cyclohexanone, isophorone and dioxane was added thereto to prepare a magnetic paint for magnetic disks.

Then, an aluminum disk plate, 14 inches in diameter, whose surfaces were cleaned in advance, was spin coated with the magnetic paint at 1,000 rpm, subjected to magnetic alignment according to a known procedure and cured at 210° C. The film thickness and the surface roughness of the magnetic disk were measured. The magnetic disk had a film thickness of 0.9 μm at R 105 mm and 1.2 μm at R 170 mm before surface finishing, as shown in FIG. 3, and a surface roughness of 0.08 μm Ra before surface finishing.

COMPARATIVE EXAMPLE 2

100 parts by weight of magnetic powder and 10 parts by weight of single crystal alumina were placed into a kneader, and mixed. Then, a solution containing 12 parts by weight of epoxy resin in 18 parts by weight of cyclohexanone was added thereto, and the mixture was thoroughly mixed. Furthermore, a solution containing 3 parts by weight of epoxy resin in 4.5 parts by weight of cyclohexanone was added thereto, and the mixture was ground under a high shear stress for about 4 hours.

Then, a magnetic paint and a magnetic disk were prepared in the same mixing ratio and in the same manner as in Example 4. The thus obtained magnetic disk had a film thickness of 0.5 μm at R 105 mm and 0.8 μm at R 170 mm before surface finishing and a surface roughness of 0.28 μm Ra before surface finishing. Flocs of the magnetic powder were observable all over the film surfaces of the magnetic disk.

COMPARATIVE EXAMPLE 3

Epoxy resin was pulverized to coarse powder having grain sizes of about 3 mm, and a magnetic paint was manufactured, using the thus obtained epoxy resin powder in the same mixing ratio and the same manner as in Example 4.

Then, an aluminum disk plate, 14 inches in diameter, whose surfaces were cleaned in advance, was spin coated with the magnetic paint at 1,000 rpm, subjected to magnetic alignment according to a known procedure, and cured at 210° C. The thus obtained magnetic disk had a film thickness of 0.6 μm at R 105 mm and 0.8 μm at R 170 mm before surface finishing, and a surface roughness of 0.12 μm Ra before surface finishing.

In the foregoing embodiments according to the present invention, epoxy resin, phenol resin and vinyl resin were used as a polymer binder, but other ordinary organic polymer compounds having a good bonding to the magnetic powder, such as vinyl-based resins, for example, vinyl chloride-vinyl acetate copolymer, vinyl chloride-vinyl acetate-vinyl alcohol copolymer, acrylonitrite-acrylic acid-2-hydroxyethylmethacrylate copolymer, etc.; rubber-based resins, for example, acrylonitrile-butadiene copolymer, etc.; cellulosic resins, for example, nitrocellulose, acetylcellulose, etc.; epoxy resins, for example, phenoxy resin, etc.; urethane-based resins, for example, urethane, urethane prepolymer, etc. can be also used.

The vinyl resin for use in the present invention as a polymer binder includes, for example, polyvinylbutyral, polyvinylformal, polyvinyl acetate, etc., among which polyvinylbutyral is particularly preferable.

EXAMPLE 7

Epoxy resin in a plate form was pulverized in a mixer to obtain epoxy resin powder having grain sizes of about 200 μm. 25 parts by weight of the thus obtained epoxy resin powder, 100 parts by weight of magnetic powder and 10 parts by weight of single crystal alumina were thoroughly mixed, and then admixed with 10 parts by weight of phenol resin in a liquid state, then further mixed in a kneader, and then admixed with 15 parts by weight of phenol resin in a liquid state, and the mixture was then ground under a high shear stress for about 4 hours.

The ground mixture was placed in a ball mill pot, admixed with 160 parts by weight of a solvent mixture of cyclohexanone and isophorone and subjected to ball milling for 5 days to disperse the magnetic powder throughout the mixture. Then, a solution containing 6 parts by weight of vinyl resin in 340 parts by weight of a solvent mixture of cyclohexanone, isophorone and dioxane was added thereto to prepare a magnetic paint for magnetic disks.

Then, an aluminum disk plate, 8.8 inches in diameter, whose surfaces were cleaned in advance, was spin coated with the magnetic paint at 1,300 rpm, subjected to magnetic alignment according to a known procedure, and cured at 210° C. Then, the film thickness of the magnetic disk was measured. The magnetic disk had a film thickness of 0.5 μm at R 65 mm and 0.5 μm at R 105 mm before the surface finishing. Then, the magnetic disk was lapped to a film thickness of 0.4 μm and a surface roughness of 0.013 μm Ra. The thus obtained magnetic disk was coated with a lubricant according to a known procedure, and the electrical characteristics of the magnetic disk were measured. It was found that the S/N ratio was 3.4.

EXAMPLE 8

25 parts by weight of phenol resin powder having grain sizes of about 1,000 μm, 100 parts by weight of magnetic powder and 10 parts by weight of single crystal alumina were thoroughly mixed, then admixed with 10 parts by weight of epoxy resin in a liquid state, and further mixed in a kneader. Then, the mixture was admixed with 15 parts by weight of epoxy resin in a liquid state and ground under a high shear stress for about 4 hours.

The ground mixture was placed in a ball mill pot, admixed with 180 parts by weight of a solvent mixture of cyclohexanone, isophorone and dioxane, and subjected to ball milling for 5 days to disperse the magnetic powder throughout the mixture. Then, a solution containing 6 parts by weight of vinyl resin in 280 parts by weight of a solvent mixture of cyclohexanone, isophorone and dioxane was added thereto to prepare a magnetic paint for magnetic disks.

Then, an aluminum disk plate, 8.8 inches in diameter, whose surfaces were cleaned in advance, was spin coated with the magnetic paint at 1,000 rpm, subjected to magnetic alignment according to a known procedure, and cured at 210° C. The film thickness of the magnetic disk was measured. The magnetic disk had a film thickness of 0.7 μm at R 65 mm and 0.8 μm at R 105 mm before surface finishing. The magnetic disk was lapped to a film thickness of 0.45 μm and a surface roughness of 0.012 μm Ra. After the thus obtained magnetic disk was coated with a lubricant according to a known procedure, the electrical characteristics of the magnetic disk were measured. It was found that the S/N ratio was 3.3.

COMPARATIVE EXAMPLE 4

100 parts by weight of magnetic powder and 10 parts by weight of single crystal alumina were placed in a kneader, mixed, then admixed with a solution containing 14 parts by weight of epoxy resin in 21 parts by weight of cyclohexanone, and further mixed. Furthermore, a solution containing 6 parts by weight of epoxy resin in 9 parts by weight of cyclohexanone was added thereto, and the mixture was ground under a high shear stress for about 4 hours.

The ground mixture was placed in a ball mill pot, admixed with 5 parts by weight of epoxy resin and 180 parts by weight of a solvent mixture of cyclohexanone and isophorone and subjected to ball milling for 5 days to disperse the magnetic powder throughout the mixture. Then, a solution containing 25 parts by weight of phenol resin and 6 parts by weight of vinyl resin in 290 parts by weight of a solvent mixture of cyclohexanone, isophorone and dioxane was added thereto to prepare a magnetic paint for magnetic disks.

Then, an aluminum disk plate, 8.8 inches in diameter, whose surfaces were cleaned in advance, was spin coated with the magnetic paint at 1,000 rpm, subjected to magnetic alignment according to a known procedure and cured at 210° C., and the film thickness of the thus obtained magnetic disk was measured. The magnetic disk had a film thickness of 0.9 μm at R 65 mm and 1.2 μm at R 105 mm before the surface finishing. The magnetic disk was lapped to a film thickness of 0.45 μm and a surface roughness of 0.013 μm Ra. After the magnetic disk was coated with a lubricant, the electrical characteristics of the magnetic disk were measured. It was found that the S/N ratio was 2.6.

EXAMPLE 9

Epoxy resin in a plate form was pulverized in a mixer to obtain epoxy resin powder having grain sizes of about 1,000 μm. 35 parts by weight of the epoxy resin powder and 100 parts by weight of magnetic powder were placed into a kneader, and thoroughly mixed. Then, the epoxy resin was melted by heating the kneader, and the mixture was ground under a high shear stress for about 4 hours.

The ground mixture was placed into a ball mill pot, admixed with 200 parts by weight of a solvent mixture of cyclohexanone and isophorone, and subjected to ball milling for 5 days to disperse the magnetic powder throughout the mixture. Then, a solution containing 35 parts by weight of phenol resin and 10 parts by weight of vinyl resin in 340 parts by weight of a solvent mixture of cyclohexanone, isophorone and dioxane was added thereto to prepare a magnetic paint for magnetic disks.

Then, an aluminum disk plate, 8.8 inches in diameter, whose surfaces were cleaned in advance, was spin coated with the magnetic paint at 1,000 rpm, subjected to magnetic alignment according to a known procedure, and cured at 210° C., and the film thickness and the surface roughness of the thus obtained magnetic disk were measured. The magnetic disk had a film thickness of 0.5 $\mu$m at both R 65 mm and R 105 mm before surface finishing, and a surface roughness of 0.045 $\mu$m Ra before surface finishing, whereby the disk noise could be reduced by 20%, as compared with that of the conventional disk (surface roughness: 0.075 $\mu$m Ra before surface finishing).

COMPARATIVE EXAMPLE 5

100 parts by weight of magnetic powder was placed into a kneader, admixed with a solution containing 14 parts by weight of epoxy resin in 21 parts by weight of cyclohexanone, and thoroughly mixed. Then, a solution containing 6 parts by weight of epoxy resin in 9 parts by weight of cyclohexanone was added thereto, and the mixture was ground under a high shear stress for about 4 hours.

The ground mixture was placed into a ball mill pot, admixed with 15 parts by weight of epoxy resin and 160 parts by weight of a solvent mixture of cyclohexanone and isophorone, and subjected to ball milling for 5 days to disperse the magnetic powder throughout the mixture. Then, a solution containing 35 parts by weight of phenol resin and 10 parts by weight of vinyl resin in 310 parts by weight of a solvent mixture was added thereto to prepare a magnetic paint for magnetic disks.

Then, an aluminum disk plate, 8.8 inches in diameter, whose surfaces were cleaned in advance, was spin coated with the magnetic paint at 1,000 rpm, subjected to magnetic alignment according to a known method, and cured at 210° C. Then, the film thickness and the surface roughness of the thus obtained magnetic disk were measured. The magnetic disk had a thickness of 0.9 $\mu$m at R 65 mm and 1.2 $\mu$m at R 105 mm before surface finishing, and a surface roughness of 0.075 $\mu$m Ra before surface finishing.

EXAMPLE 10

Epoxy resin powder having grain sizes of about 10 $\mu$m was prepared by jet milling.

25 parts by weight of the thus obtained epoxy resin powder, 100 parts by weight of a magnetic powder and 10 parts by weight of single crystal alumina were thoroughly mixed, then admixed with 10 parts by weight of cyclohexanone, then further mixed in a kneader, and then admixed with 5 parts by weight of cyclohexanone. The mixture was then ground under a high shear stress for about 4 hours.

The ground mixture was placed in a ball mill pot, and 200 parts by weight of a solvent mixture of cyclohexanone and isophorone was added thereto. The mixture was subjected to ball milling for 5 days to disperse the magnetic powder throughout the mixture. Then, a solution containing 25 parts by weight of phenol resin and 6 parts by weight of vinyl resin in 350 parts by weight of a solvent mixture of cyclohexanone, isophorone and dioxane was added to the ball-milled mixture to prepare a magnetic paint for magnetic disks. The magnetic paint was preserved for 10 days with stirring. Then, an aluminum disk plate, 8.8 inches in diameter, whose surfaces were cleaned in advance, was spin coated with the magnetic paint at 1,500 rpm and then subjected to magnetic alignment according to a known procedure. The thus coated magnetic disk was cured at 210° C. and its film thickness and surface roughness were measured.

The thus obtained disk had a film thickness of 0.38 $\mu$m at R 65 mm and 0.40 $\mu$m at R 105 mm before surface finishing and a surface roughness of 0.030 $\mu$m Ra before surface finishing, and no visual defects were observed on the film surfaces. In this magnetic paint, no refloculation of the magnetic powder occurred even when the magnetic paint was preserved for a long time. Thus it was possible to obtain a thin film having a low surface roughness, as mentioned above.

EXAMPLE 11

Epoxy resin powder having grain sizes of about 3 $\mu$m was prepared by jet milling, and a magnetic paint and a magnetic disk were prepared in the same mixing ratio and preparatory manner as in Example 10, except that the thus prepared epoxy resin powder was used in place of the epoxy resin powder of Example 10. The thus obtained magnetic disk had a film thickness of 0.38 $\mu$m at R 65 mm and 0.38 $\mu$m at R 105 mm before surface finishing and a surface roughness of 0.027 $\mu$m Ra before surface finishing, and no visible defects were observed on the film surfaces.

As described Examples 10 and 11, the powdery resin having particle sizes of not more than 10 $\mu$m is particularly effective in the present invention.

For formation of a thin film coating disk, a magnetic paint containing a large amount of the solvent is usually used. In such a magnetic paint, flocculation of the magnetic powder occurs easily. Thus, it is impossible to obtain a thin film having a low surface roughness and preserve a magnetic paint for a long time.

As shown in the above examples, the present inventors have found that there is no trouble in the thin film coating by using fine powdery resins having particle sizes of not more than 10 $\mu$m.

COMPARATIVE EXAMPLE 6

100 parts by weight of magnetic powder, 100 parts by weight of single crystal alumina and 15 parts by weight of epoxy resin powder having grain sizes of about 100 $\mu$m were thoroughly mixed, and then admixed with 20 parts by weight of cyclohexanone. Then, the thus obtained mixture was further mixed in a kneader, then admixed with 5 parts by weight of cyclohexanone, and ground under a high shear stress for about 4 hours.

The ground mixture was placed in a ball mill pot, admixed with 180 parts by weight of a solvent mixture of cyclohexanone and isophorone and subjected to ball milling for 5 days to disperse the magnetic powder throughout the mixture. Then, a solution containing 25 parts by weight of phenol resin and 6 parts by weight of vinyl resin in 350 parts by weight of a solvent mixture of cyclohexanone, isophorone and dioxane was added to the ball-milled mixture to prepare a magnetic paint for magnetic disks. The magnetic paint could be preserved for 10 days with stirring. Then, an aluminum disk plate, 8.8 inches in diameter, whose surfaces were cleaned in advance, was spin coated with the magnetic paint at 1,500 rpm and then subjected to magnetic alignment according to a known procedure. The thus coated magnetic disk was cured at 210° C and its film thickness and surface roughness were measured.

The thus obtained disk had a film thickness of 0.42 μm at R 65 mm and 0.43 μm at R 105 mm before surface finishing and a surface roughness of 0.120 μm Ra before surface finishing. Flocs of the magnetic powder were observable on the film surfaces of the magnetic disk.

The magnetic power used in the foregoing Examples and Comparative Examples had a BET surface area of 30 $m^2/g$ or less, whereas the following Examples show cases of using a magnetic powder having a BET surface area of 40 $m^2/g$ or more.

EXAMPLE 12

Epoxy resin in a plate form was pulverized in a jet mill to obtain an epoxy resin powder having a particle size of about 8.0 μm. Then, 25 parts by weight of the thus obtained powdery epoxy resin, 100 parts by weight of a magnetic powder, Co-coated iron oxide powder (Hc 770 Oe) with a BET surface area of 40 $m^2/g$ and 5 parts by weight of single crystal alumina were thoroughly mixed, and then admixed with 10 parts by weight of cyclohexanone. The mixture was further mixed in a kneader-grinder. Then, the mixture was admixed with 5 parts by weight of cyclohexanone and ground under a high shear stress for about 4 hours.

Then, the ground mixture was placed in a ball mill pot, admixed with 140 parts by weight of a solvent mixture of cyclohexanone and isophorone and subjected to ball mill grinding for 3 days to disperse the magnetic powder throughout the mixture. Then, the ball milled mixture was admixed with a solution of 25 parts by weight of phenol resin and 6 parts by weight of vinyl resin in 490 parts by weight of a solvent mixture of cyclohexanone, isophorone and dioxane to prepare a magnetic paint for a magnetic disk. Then, the thus prepared paint was applied to an aluminum substrate disk, 5.25 inches in diameter, whose surface was cleaned in advance, by spin coating and subjected to magnetic alignment according to a known procedure. The thus obtained magnetic disk was cured at 210° C. and then its film thickness and surface roughness were measured.

The thus obtained disk had a film thickness of 0.50 μm at R38 mm and also at R60 mm before surface finishing and a surface roughness of 0.020 μm Ra before surface finishing. Then, the disk was subjected to surface finishing according to a known procedure to make the film thickness 0.30 μm both at R38 mm and R60 mm after surface finishing.

Figure 5:
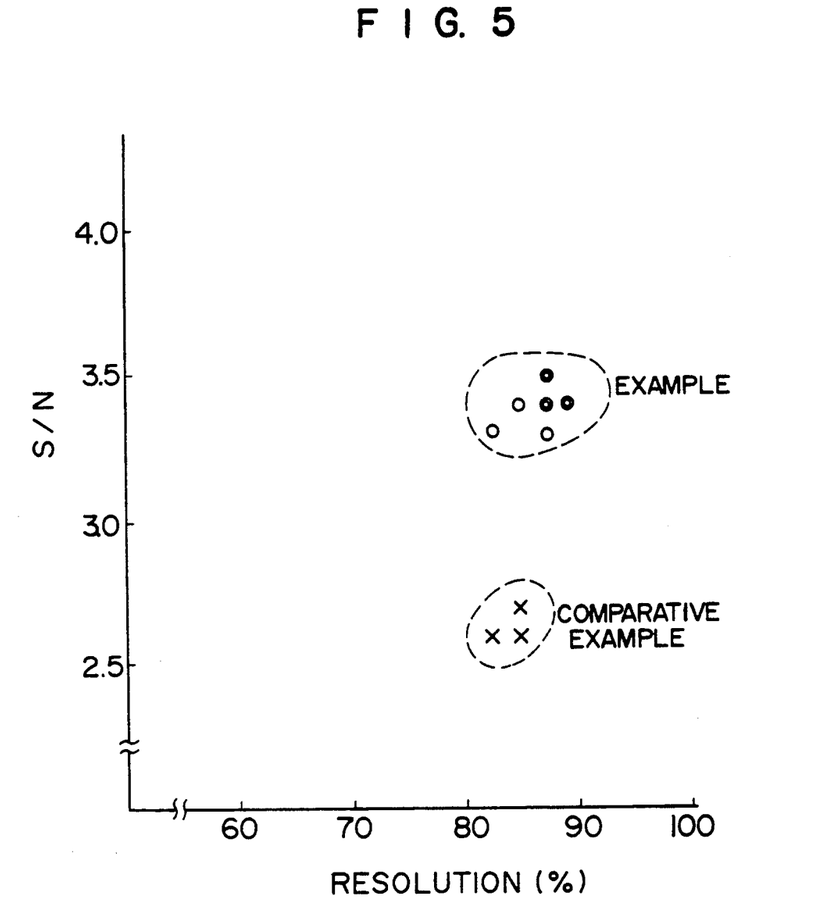
FIG. 5 is a diagram showing electric characteristics of magnetic disks, where double circle marks "⊙" show the electrical characteristics of Example 7, single circle marks "○" show those of Example 8, and cross marks "X" show those of Comparative Examples 4 and 5.
Figure 6:
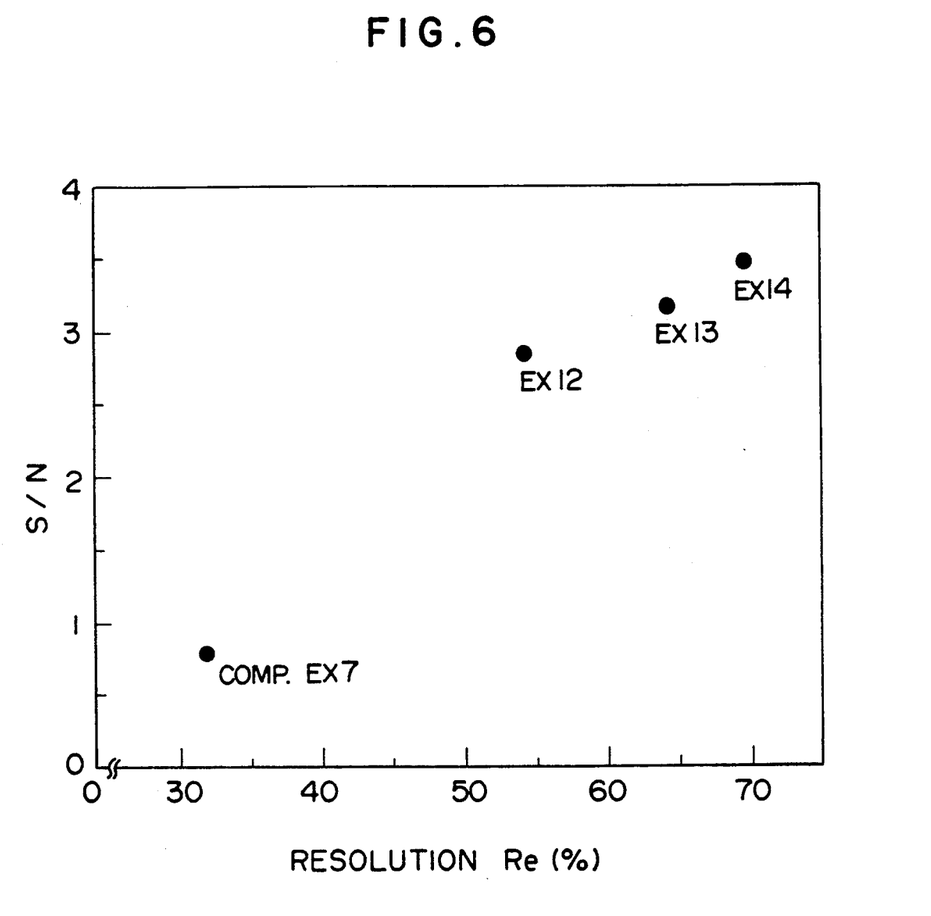
FIG. 6 shows electrical characteristics of Examples 12, 13, and 14, and Comparative Example 7.

Then, the disk was subjected to electrical measurement with a metal-in-gap type head having a gap length of 0.3 μm under measurement conditions such as a maximum recording frequency of 26.25.KFCI and a minimum recording frequency of 6.56 KFCI, whereby reproduction output and noise were measured. From these measurements, a ratio of the signal at the maximum recording frequency to the noise, i.e. S/N and the signal at the maximum recording frequence, divided by the signal at the minimum recording frequency and represented in percentage, i.e. resolution, were obtained and shown in FIG. 5, where the ordinate shows the S/N and the abscissa show the resolution. Same measurement was carried out in the following Examples and Comparative Examples and the results are also shown in FIG. 6.

EXAMPLE 13

100 parts by weight of magnetic powder, co-coated iron oxide powder (Hc 770 Oe) with a BET specific surface area of 45 $m^2/g$, 5 parts by weight of single crystal alumina and 25 parts by weight of epoxy resin powder having particle sizes of about 3.0 μm were thoroughly mixed and then admixed with 10 parts by weight of cyclohexanone. The mixture was further mixed in a kneader-grinder and then admixed with 5 parts by weight of cyclohexanone and ground under a high shear stress for about 4 hours.

Then, the ground mixture was placed in a ball mill pot, admixed with 140 parts by weight of a solvent mixture of cyclohexanone and isophorone and subjected to ball mill grinding for 3 days to disperse the magnetic powder throughout the mixture. Then, the ball milled mixture was admixed with a solution of 25 parts by weight of phenol resin and 6 parts by weight of vinyl resin in 550 parts by weight of a solvent mixture of cyclohexanone, isophorone and dioxane to prepare a magnetic paint for a magnetic disk. Then, the thus prepared paint was applied to an aluminum substrate disk, 5.25 inches in diameter, whose surface was cleaned in advance, by spin coating and subjected to magnetic alignment according to a known procedure. After curing, the film thickness and the surface roughness were measured. The disk had a film thickness of 0.40 μm both at R38 mm and R60 mm before surface finishing and a surface roughness of 0.018 μm Ra before surface finishing. No visible defects were found on the film surface. Then, the disk was subjected to surface finishing according to a known procedure to make the film thickness 0.22 μm both at R38 mm and R60 mm after surface finishing.

EXAMPLE 14

100 parts by weight of magnetic powder, Co-coated iron oxide powder (Hc 770 Oe) with a BET surface area of 50 $m^2/g$ and 25 parts by weight of epoxy resin powder having a particle size of about 2.0 μm were thoroughly mixed and then admixed with 10 parts by weight of cyclohexanone and further mixed in a kneader-grinder. Then, the mixture was admixed with 5 parts by weight of cyclohexanone and ground under a high shear stress for about 4 hours.

Then, the ground mixture was placed in a ball mill pot and admixed with 165 parts by weight of a solvent mixture of cyclohexanone and isophorone and subjected to ball mill grinding for 3 days to disperse the magnetic powder throughout the mixture. Then, the ball milled mixture was admixed with a solution of 25 parts by weight of phenol resin and 6 parts by weight of vinyl resin in 600 parts by weight of a solvent mixture of cyclohexanone, isophorone and dioxane to prepare a magnetic paint for a magnetic disk. Then, the thus prepared paint was applied to an aluminum substrate disk, 5.25 inches in diameter, whose surface was cleaned in advance, by spin coating, and subjected to magnetic alignment according to a known procedure. After curing the film thickness and the surface roughness were measured. The disk had a film thickness of 0.30 μm both at R38 mm and R60 mm before surface finishing and a surface roughness of 0.015 μm Ra before surface finishing. Then, the disk was subjected to surface finishing according to a known procedure to make the film thickness 0.20 μm both at R38 mm and R60 mm after surface finishing.

COMPARATIVE EXAMPLE 7

100 parts by weight of magnetic powder, iron oxide powder (Hc 350 Oe) with a BET specific surface area of 30 m$^2$/g and 5 parts by weight of single crystal alumina were charged into a kneader-grinder. Then, the mixture was admixed with a solution of 14 parts by weight of epoxy resin in 21 parts by weight of cyclohexanone and subjected to further mixing. Then, the mixture was admixed with a solution of 6 parts by weight of epoxy resin in 9 parts by weight of cyclohexanone and ground under a high shear stress for about 4 hours.

The ground mixture was placed in a ball mill pot, admixed with 5 parts by weight of epoxy resin and 180 parts by weight of a solvent mixture of cyclohexanone and isophrone and subjected to ball mill grinding for 5 days to disperse the magnetic powder throughout the mixture. Then, the ball milled mixture was admixed with a solution of 25 parts by weight of phenol resin and 6 parts by weight of vinyl resin in 350 parts by weight of a solvent mixture of cyclohexanone, isophorone and dioxane to prepare a magnetic paint for a magnetic disk.

Then, the thus prepared paint was applied to an aluminum substrate disk, 5.25 inches in diameter, whose surface was cleaned in advance, by spin coating and subjected to magnetic alignment according to a known procedure. After curing, the film thickness and surface roughness of the disk were measured. The thus obtained disk had a film thickness of 0.9 μm at R38 mm and 1.0 μm at R60 mm before surface finishing and a surface roughness of 0.08 μm Ra before surface finishing. Then, the disk was subjected to surface finishing according to a known procedure to make the film thickness 0.3 μm at R38 mm and 0.35 μm at R60 mm after surface finishing.

COMPARATIVE EXAMPLE 8

100 parts by weight of magnetic powder, Co-coated iron oxide powder (Hc 770 Oe) with a BET specific surface area of 40 m$^2$/g and 5 parts by weight of single crystal alumina were charged into a kneader-grinder and mixed. Then, the mixture was admixed with a solution of 14 parts by weight of epoxy resin in 21 parts by weight of cyclohexanone and subjected to further mixing. Then, the mixture was admixed with a solution of 6 parts by weight of epoxy resin in 9 parts by weight of cyclohexanone and subjected to grinding under a high shear stress for about 4 hours.

Then, the ground mixture was placed in a ball mill pot, admixed with 5 parts by weight of epoxy resin and 180 parts by weight of a solvent mixture of cyclohexanone and isophorone and subjected to ball mill grinding for 5 days to disperse the magnetic powder throughout the mixture. Then, the ball milled mixture was admixed with a solution of 25 parts of phenol resin and 6 parts by weight of vinyl resin in 450 parts by weight of a solvent mixture of cyclohexanone, isophorone and ioxane to prepare a magnetic paint for a magnetic disk.

The thus prepared paint was applied to an aluminum substrate disk, 5.25 inches in diameter, whose surface was cleaned in advance, by spin coating, and subjected to magnetic alignment according to a known procedure. After curing, the film thickness and the surface roughness were measured. The disk had a film thickness of 0.4 μm at R38 mm and 0.7 μm at R60 mm before surface finishing and a surface roughness of 0.23 μm R before surface finishing. COMPARATIVE EXAMPLE 9

Epoxy resin in a plate form was pulverized a mixer to obtain an epoxy resin powder having particle sizes of about 100 μm. 25 parts by weight of the thus prepared powdery epoxy resin, 100 parts by weight of magnetic powder, iron oxide powder (Hc 340 Oe) with a BET specific surface area of 22 m$^2$/g and 5 parts by weight of single crystal alumina were thoroughly mixed. Then the mixture was admixed with 10 parts by weight of cyclohexanone and subjected to further mixing in a kneader-grinder. Then, the mixture was admixed with 5 parts by weight of cyclohexanone and ground under a high shear stress for about 4 hours.

Then, the ground mixture was placed in a ball mill pot, admixed with 200 parts by weight of a solvent mixture of cyclohexanone and isophorone and subjected to ball mill grinding for 5 days to disperse the magnetic powder throughout the mixture. Then, the ball milled mixture was admixed with a solution of 25 parts by weight of phenol resin and 6 parts by weight of vinyl resin in 280 parts by weight of a solvent mixture of cyclohexanone, isophorone and dioxane to prepare a magnetic paint for a magnetic disk.

Then, the thus prepared paint was applied to an aluminum substrate disk, 5.25 inches in diameter, whose surface was cleaned in advance, by spin coating, and subjected to magnetic alignment according to a known procedure. After curing at 210° C., the film thickness and the surface roughness of the disk were measured. The disk had a film thickness of 0.8 μm at R38 mm and 0.9 μm at R60 mm before surface finishing and a surface roughness of 0.045 μm Ra before surface finishing.

EXAMPLE 15

Epoxy resin in a plate form was pulverized in a jet mill to obtain an epoxy resin powder having particle sizes of about 8.0 μm. 27.5 parts by weight of the thus prepared powdery epoxy resin, 100 parts by weight of magnetic powder, Co-coated iron oxide powder (Hc 770 Oe) with a BET specific surface area of 40 m$^2$/g and 5 parts by weight of single crystal alumina were thoroughly mixed. Then, the mixture was admixed with 100 parts by weight of cyclohexanone and subjected to further mixing in a kneader-grinder. Then, the mixture was further admixed with 5 parts by weight of cyclohexanone and ground under a high shear stress.

The ground mixture was placed in a ball mill pot, admixed with 160 parts by weight of a solvent mixture of cyclohexanone and isophorone and subjected to ball mill grinding for 3 days to disperse the magnetic powder throughout the mixture. Then, the ball-milled mixture was admixed with a solution of 27.5 parts by weight of phenol resin and 6 parts by weight of vinyl resin in 800 parts by weight of a solvent mixture of cyclohexanone, isophorone and dioxane to prepare a magnetic paint for a magnetic disk. Then, the thus prepared paint was applied to an aluminum substrate disk, 5.25 inches in diameter, whose surface was cleaned in advance, by spin coating, and subjected to magnetic alignment according to a known procedure. After curing at 210° C., the film thickness and the surface roughness of the disk were measured. The disk had a film thickness of 0.20 μm both at R38 mm and R60 mm, a surface roughness of 0.014 μm Ra and a Br/Bm ratio in the circumferential direction of 0.85 before surface finishing. No visible defects were detected at all on the film surface. Then, the magnetic disk was subjected to tape vanishing to remove the projections on the film surface. The film thickness of the magnetic disk was not changed after vanishing and was 0.20 μm all over the surface from the inner peripheral side to the outer peripheral side of the disk. Then, the magnetic disk could perform recording and reproduction by making a magnetic head run over the magnetic disk at a distance of 0.20 μm from the magnetic disk.

EXAMPLE 16

100 parts by weight of magnetic powder, Co-coated iron oxide powder (Hc 770 Oe) with a BET specific surface of 45 m$^2$/g, 3 parts by weight of single crystal alumina and 27.5 parts by weight of fine epoxy resin powder having particle sizes of about 3.0 μm were thoroughly mixed. Then, the mixture was admixed with 10 parts by weight of cyclohexanone and subjected to further mixing in a kneader-grinder. Then, the mixture was admixed with 5 parts by weight of cyclohexanone and ground under a high shear stress.

Then, the ground mixture was placed in a ball mill pot, admixed with 160 parts by weight of a solvent mixture of cyclohexanone and isophorone and subjected to ball mill grinding for 3 days to disperse the magnetic powder throughout the mixture. Then, the ball milled mixture was admixed with a solution of 12.5 parts by weight of phenol resin and 6 parts by weight of vinyl resin in 990 parts by weight of a solvent mixture of cyclohexanone, isophorone and dioxane to prepare a magnetic paint for a magnetic disk.

Then, the thus prepared paint was applied to an aluminum substrate disk, 5.25 inches in diameter, whose surface was cleaned in advance, by spin coating, and subjected is magnetic alignment according to a known procedure. After curing, the film thickness and the surface roughness were measured. The disk had a film thickness of 0.10 μm both at R38 mm and R60 mm, a surface roughness of 0.012 μm Ra and a Br/Bm ratio in the circumferential direction of 0.84 before surface finishing. No visible defects were detected at all on the film surface.

Then, the magnetic disk was subjected to tape vanishing to remove projections on the film surface. The film thickness of the magnetic disk was not changed after the vanishing and was 0.10 μm all over the surface from the inner peripheral side to the outer peripheral side. The magnetic disk could perform recording and reproduction by making a magnetic head run over the magnetic disk at a distance of 0.20 μm from the magnetic disk.

EXAMPLE 17

100 parts by weight of magnetic powder, Co-coated iron oxide powder (Hc 770 Oe) with a BET specific surface area of 50 m$^2$/g, 3 parts by weight of single crystal alumina and 35 parts by weight of fine epoxy resin powder having particle sizes of 2.0 μm were thoroughly mixed. Then, the mixture was admixed with 10 parts by weight of cyclohexanone and ground under a high shear stress in a kneader-grinder.

The ground mixture was placed in a ball mill pot, admixed with 130 parts by weight of a solvent mixture of cyclohexanone and isophorone and subjected to ball mill grinding for 3 days to disperse the magnetic powder throughout the mixture. Then, the ball milled mixture was admixed with a solution of 15 parts by weight of phenol resin and 3 parts by weight of vinyl resin in 1,400 parts by weight of a solvent mixture of cyclohexanone, isophorone and dioxane to prepare a magnetic paint for a magnetic disk.

Then, the thus prepared paint was applied to an aluminum substrate disk, 5.25 inches in diameter, whose surface was cleaned in advance, by spin coating, and subjected to magnetic alignment according to a known procedure. After curing, the film thickness and the surface roughness were measured. The disk had a film thickness of 0.07 μm both at R38 mm and R60 mm, a surface roughness of 0.011 μm Ra and a Br/Bm ratio in the circumferential direction of 0.80 before surface finishing. No visible defects were detected at all on the film surface.

Then, the magnetic disk was subjected to tape vanishing to remove projections on the film surface. The film thickness of the magnetic disk was not changed after the vanishing and was 0.07 μm all over the surface from the inner peripheral side to the outer peripheral side. The magnetic disk could perform recording and reproduction by making a magnetic head run over the magnetic head at a distance of 0.20 μm from the magnetic disk.

EXAMPLE 18

100 parts by weight of magnetic powder, Co-coated iron oxide powder (Hc 770 Oe) with a BET specific surface area of 55 m$^2$/g, a very small amount of fine diamond particles and 40 parts by weight of epoxy resin powder having particle sizes of about 2.0 μm were thoroughly mixed. Then, the mixture was admixed with 10 parts by weight of cyclohexanone and ground under a high shear stress.

Then, the ground mixture was placed in a ball mill pot, admixed with 130 parts by weight of a solvent mixture of cyclohexanone and isophorone and subjected to ball mill grinding for 3 days to disperse the magnetic powder throughout the mixture.

Then, the mixture was admixed with a solution of 20 parts by weight of phenol resin and 6 parts by weight of vinyl resin in 1,850 parts by weight of a solvent mixture of cyclohexanone, isophorone and dioxane to prepare a magnetic paint for a magnetic disk.

Then, the thus prepared paint was applied to an aluminum substrate disk, 5.25 inches in diameter, whose surface was cleaned in advance, by spin coating and subjected to magnetic alignment according to a known procedure. After curing, the film thickness and surface roughness were measured. The disk had a film thickness of 0.05 μm both at R38 mm and R60 mm, a surface roughness of 0.010 μm Ra and a Br/Bm ratio in the circumferential direction of 0.75 before surface finishing. No visible defects were detected at all on the film surface.

Then, the magnetic disk was subjected to tape vanishing to remove projections on the film surface. The film thickness of the magnetic disk was not changed at all after the vanishing and was 0.05 μm all over the surface from the inner peripheral side to the outer peripheral side. The magnetic disk could perform recording and reproduction by making a magnetic head run over the magnetic disk at a distance of 0.20 μm from the magnetic disk.

EXAMPLE 19

100 parts by weight of magnetic powder, Co-coated iron oxide powder (Hc 770 Oe) with a BET specific surface area of 50 m$^2$/g and 40 parts by weight of epoxy resin powder having particle sizes of about 2.0 μm were thoroughly mixed. Then, the mixture was admixed with 10 parts by weight of cyclohexanone and ground in a high shear stress.

The ground mixture was placed in a ball mill pot, admixed with 130 parts by weight of a solvent mixture of cyclohexanone and isophrorone and subjected to ball mill grinding for 3 days to disperse the magnetic powder throughout the mixture. Then, the ball milled mixture was admixed with a solution of 20 parts by weight of phenol resin and 6 parts by weight of vinyl resin in 2,350 parts by weight of a solvent mixture of cyclohexanone, isophorone and dioxane to prepare a magnetic paint for a magnetic disk. Then, the thus prepared paint was applied to an aluminum substrate disk, 5.25 inches in diameter, whose surface was cleaned in advance, by spin coating, and subjected to magnetic alignment. After curing, the film thickness and the surface roughness were measured. The disk had a film thickness of 0.02 μm both at R38 mm and R60 mm and a surface roughness of 0.008 μm Ra. No visible defects were detected at all on the film surface.

Then, the magnetic disk was subjected to tape vanishing to remove projections on the film surface. The film thickness of the magnetic disk was not changed after the vanishing and was 0.02 μm all over the surface from the inner peripheral side to the outer peripheral side. The magnetic disk could perform recording and reproduction by making a magnetic head run over the magnetic disk at a distance of 0.20 μm from the magnetic disk.

Line recording density $D_{50}$ for giving a reproduction output which corresponds to 50% of the output of isolated pulse wave was obtained for the magnetic disks of Examples 12 to 18. The results are given in the following Table.

TABLE

| Example No. | Magnetic powder | Thickness of magnetic film (μm) | $D_{50}$ (k FCI) |
| --- | --- | --- | --- |
| 12 | Co-coated iron oxide Hc: 770 Oe BET: 40 m²/g | 0.30 | 26.9 |
| 13 | Co-coated iron oxide Hc: 770 Oe BET: 45 m²/g | 0.22 | 30.0 |
| 14 | Co-coated iron oxide Hc: 770 Oe BET: 50 m²/g | 0.20 | 31.2 |
| 15 | Co-coated iron oxide Hc: 770 Oe BET: 40 m²/g | 0.20 | 31.5 |
| 16 | Co-coated iron oxide Hc: 770 Oe BET: 45 m²/g | 0.10 | 37.5 |
| 17 | Co-coated iron oxide Hc: 770 Oe BET: 50 m²/g | 0.07 | 39.0 |
| 18 | Co-coated iron oxide Hc: 770 Oe BET: 55 m²/g | 0.05 | 40.4 |

As is obvious from Table 1, the line recording density $D_{50}$ of magnetic disks can be made 30 kFCI or higher, which is considerably higher than the present maximum level of $D_{50}=18$ kFCI, at a distance of 0.2 μm between the magnetic head and the magnetic disk by making the magnetic film of a magnetic disk thinner. By making the distance between the magnetic head and the magnetic disk 0.15 μm, $D_{50}=40-50$ kFCI can be obtained.

In Examples 12 to 18, Co-coated iron oxide powder is used as a magnetic material, and $D_{50}$ can be increased by using barium ferrite powder, Fe metal powder, etc. as the magnetic material.

As described in detail above, the magnetic paints prepared according to Examples 12 to 19 had a tactoid structure where the magnetic powder was uniformly dispersed in the paints. By using the magnetic paints in a magnetic recording medium, for example, a magnetic disk based on a 5.25-inch aluminum substrate disk, a thin magnetic film having a uniform film thickness, for example, 0.6 to 0.02 μm, all over the surface from the inner peripheral side to the outer peripheral side of the magnetic disk and a very small surface roughness of 0.020 to 0.008 μm Ra can be readily obtained by coating. Thus, the surface finishing time can be considerably reduced, as compared with the prior art and the electrical defects due to scratches formed during the surface finishing can be effectively reduced. Furthermore, the noise of the present magnetic disk can be reduced by about 30%, and also an increase in the output resolution can be expected. Furthermore, problems with a magnetic head can be solved because of the small thickness on the outer peripheral side of the present magnetic head.

The recording-reproduction apparatus according composed of a magnetic material having a saturation magnetic film density of 4 kG or more, preferably 9 kG or more and a magnetic disk and a magnetic recording disk comprising a non-magnetic substrate and a magnetic coating film having a film thickness of 0.02 μm to 0.6 μm and a surface roughness of not more than 0.02 μm Ra before surface finishing, provided on the non-magnetic substrate, where the magnetic material of the magnetic head is in a thin film having a film thickness of 5 μm or more.

According to the present invention, it is possible for the first time to form a very thin, smooth magnetic film with a very small surface roughness. The present invention is applicable not only to the formation of a single layer of a magnetic film on a non-magnetic substrate, but also to the formation of at least two layers of the magnetic film on the non-magnetic substrate.

The continuously deposited medium formed by sputtering, vapor deposition, plating, etc. has distinguished electromagnetic conversion characteristics but is not better in the reliability than the coated medium. The coated medium can contain a reinforcing material, a lubricant, etc. in the film, whereas the continuously deposited medium cannot contain such additives as above. This is the main reason for the poor reliability of the continuously deposited medium. Thus, it is possible to increase the reliability of the continuously deposited medium up to the level of the coated medium by forming a very thin magnetic layer of the present invention containing a reinforcing material such as a very small amount of fine diamond particles, etc. on the surface of the continuously deposited medium, where the holding power of the very thin magnetic layer of the present invention is made equal to that of the continuously deposited medium.

In the foregoing Examples of the present invention, epoxy resin, phenol resin and vinyl resin are used as a polymeric brinder. Other ordinary organic polymer compounds having a good binding to the magnetic powder such as usually used vinylic resins such as vinyl chloride-vinyl acetate copolymer, vinyl chloride-vinyl acetate-vinyl alcohol copolymer, acrylonitrite-acrylic acid-2-hydroxyethylmethacrylate copolymer, etc., rubber-based resins such as acrylonitrite-butadiene copolymer, etc., cellulose-based resins such as nitrocellulose, acetylcellulose, etc., epoxy resins such as phenoxy resin, etc., urethane-based resins such as polyurethane, urethane prepolymer, etc. can be also used.

The vinyl resin for use in the present invention as the polymeric brinder includes, for example, polyvinylbutyral, polyvinylformal, polyvinyl acetate, etc., among which polyvinylbutyral is particularly preferable.

The magnetic powder for use in the present invention is preferably Co-coated iron oxide powder with a BET specific surface area of 40 m$^2$/g or more as used in Examples 12 to 19. Iron oxide powder, metal powder, barium ferrite powder, iron carbide powder, etc. with a BET specific surface area of 40 m$^2$/g or more can be used as the magnetic powder.

What is claimed is:

1. A magnetic recording hard disk which comprises a non-magnetic substrate and a magnetic coating film comprising magnetic powder and a binder and having a film thickness of 0.02 μm to 0.2 μm and a surface roughness of not more than 0.014 μm Ra, provided on the non-magnetic substrate, the magnetic coating film being free from surface finishing for making the film thinner.

* * * * *